United States Patent [19]

Serba

[11] Patent Number: 5,490,348

[45] Date of Patent: Feb. 13, 1996

[54] TWO PIECE SLIP BOBBER

[76] Inventor: Henry S. Serba, 4343 N. Clarendon St. 1512, Chicago, Ill. 60613

[21] Appl. No.: 380,943

[22] Filed: Jan. 31, 1995

[51] Int. Cl.$^6$ ..................................... A01K 93/00
[52] U.S. Cl. .................. 43/44.93; 43/44.9; 43/44.95; 43/44.88; 43/44.91
[58] Field of Search ................ 43/44.87, 44.88, 43/44.9, 44.91, 44.93, 44.95

[56] References Cited

U.S. PATENT DOCUMENTS

| | | | |
|---|---|---|---|
| 668,254 | 2/1901 | Dickinson | 43/44.9 |
| 729,687 | 6/1903 | Smith | 43/44.93 |
| 1,418,944 | 6/1922 | Lower | 43/44.95 |
| 2,162,659 | 6/1939 | Wilson | 43/44.88 |
| 2,302,549 | 11/1942 | Hodges | 43/44.87 |
| 2,379,676 | 7/1945 | Blackstone | 43/44.88 |
| 2,444,791 | 7/1948 | Stahnke | 43/44.88 |
| 2,481,346 | 9/1949 | Rigby | 43/44.87 |
| 2,525,067 | 10/1950 | Dungan | 43/44.93 |
| 2,570,293 | 10/1951 | Vadnais | 43/44.91 |
| 2,593,524 | 4/1952 | Blihik | 43/44.93 |
| 2,992,508 | 7/1961 | Schmidt | 43/44.91 |
| 3,084,470 | 4/1963 | Heater | 43/44.91 |
| 3,667,149 | 6/1972 | Daigle | 43/44.91 |
| 3,866,346 | 2/1975 | Schneider | 43/44.87 |
| 3,949,513 | 4/1976 | Druytriw | 43/44.93 |
| 5,243,780 | 9/1993 | Christensen | 43/44.93 |

Primary Examiner—Kurt Rowan
Attorney, Agent, or Firm—Don Moyer

[57] ABSTRACT

A bobber is constructed of a float and a stem. The cross section of the stem is just less than the cross section of a bore in the float. The stem has a slot in the stem body along the center line of the stem. The stem also has a channel in the body of the stem which extends radially into the stem body to just beyond the stem center line and which extends vertically from the stem slot bottom to the stem in-water end. A fishing line can be removably placed into the stem slot so that the fishing line hook end hangs vertically in the stem channel. The stem also has a bulge in the stem body so that the stem can be removably wedged into the float bore with the stem slot mouth in the float bore and the stem slot bottom below the keel end of the float. Thus the fishing line is attached to the bobber but is free to slip. When the bobber is in water the center lines of the float, the float bore, and the stem all coincide. Thus the hook end hangs along the extension of these coincident center lines, and there is no moment arm for net vertical forces to cause unwanted rotation of the bobber.

4 Claims, 1 Drawing Sheet

U.S. Patent — Feb. 13, 1996 — 5,490,348
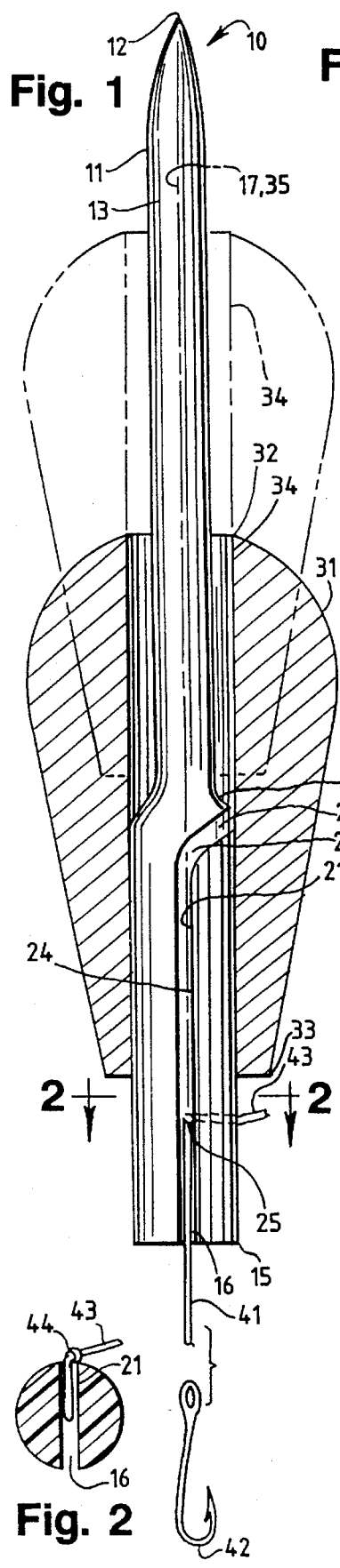
Fig. 1
Fig. 2
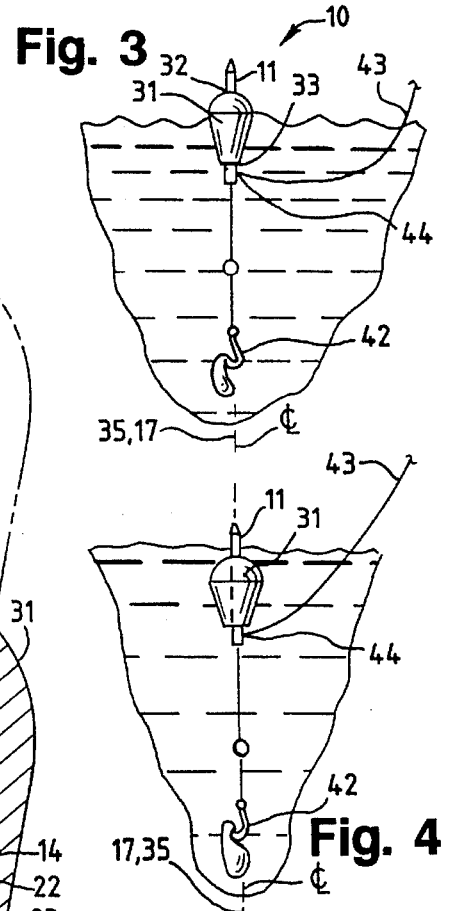
Fig. 3
Fig. 4
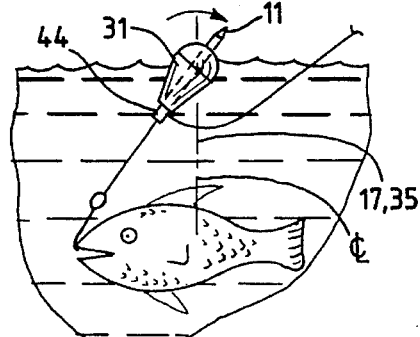
Fig. 5
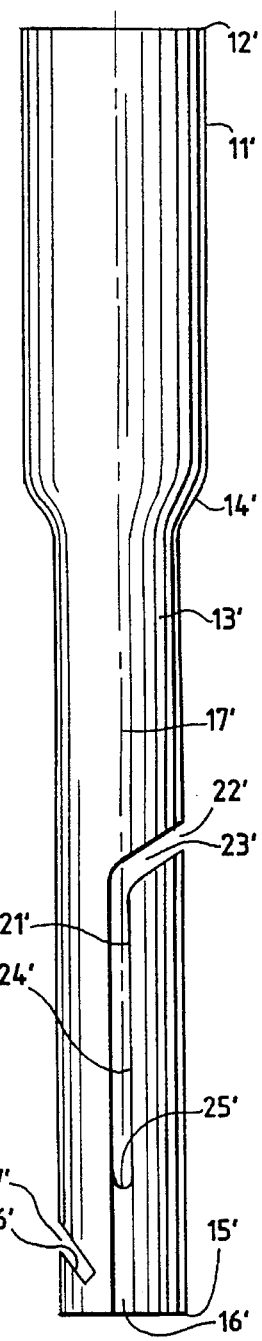
Fig. 6
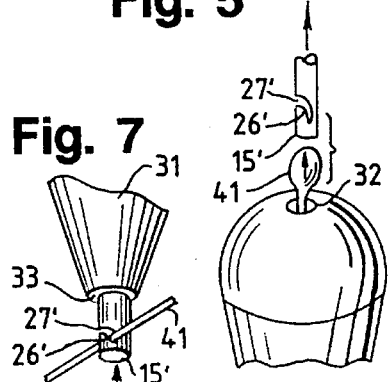
Fig. 7
Fig. 8
Fig. 9

TWO PIECE SLIP BOBBER

BACKGROUND OF THE INVENTION

This invention relates to bobbers which are used by anglers, which allow the fishing line to slip through the bobber, and which are free of unwanted rotation.

Many designs of angler's bobbers have progressed the art, and there are opportunities to progress the art further. For example the bobber proposed in U.S. Pat. No. 729,687 by Smith uses just two pieces, a float and a stem. The line is positioned in a notch in the stem, and the stem and the line are wedged into the float so that the line is fixed. The rotational stability, limited here by the moment arm resulting from the hook end of the line being offset from the center line of the bobber, can be improved. The bobber proposed in U.S. Pat. No. 2,379,676 by Blackstone also wedges a stem and the line into the float. Here the stem can drop out of the wedged position, with a knob end of the stem held in the float by an interior shoulder, so that the line can slip. The manufacturing costs of the knob end on the stem and the interior shoulder of the float can be avoided. Again here the line is offset from the center line of the bobber.

The bobber proposed in U.S. Pat. No. 2,525,067 by Dungan uses a two piece stem, one piece having a slot to receive the line. The two piece stem can be adjusted to wedge the stem and line into the float or to leave part of the slot outside the float so that the line can slip. The manufacturing costs of the two piece stem with matching grove and tapered portion can be bypassed. Here also the line is offset from the centerline of the bobber. The bobber proposed in U.S. Pat. No. 2,992,508 by Schmidt shows a spring and hook arrangement which allows the line to be fixed to the float or held loosely to slip. This arrangement requires manufacture and assembly of numerous parts.

It is very important that a bobber be self-uprighting. When the line is offset from the center line of the bobber and the offset provides a moment arm, then vertical forces normally encountered while angling will cause an unwanted rotation of the bobber. For example, when the bobber rides down to the bottom of a ripple in a body of water, then the inertia of the hook end of the line will act through the moment arm to cause a rotation of the bobber, giving a false indication of a nibble at the bait. The bobber proposed in U.S. Pat. No. 3,084,470 by Heater uses a weighted stem to get the bobber to stand upright. Here the line is threaded through holes in the stem and float and wedged into the float. Though the position of the bobber along the line can be adjusted, the bobber can not be easily removed from, or added to, a line.

Thus, there are opportunities to progress the art further by making a bobber which is self-uprighting, which is a slip bobber and a fixed bobber, which is easy to attach or remove from a line, and which has low manufacturing costs.

SUMMARY OF THE INVENTION

Objects of this invention include the following. First, make a bobber which has only two parts with low manufacturing costs. Second, make a bobber which is a slip bobber and which easily can be converted to a fixed bobber. Third, make a bobber which easily can be attached to and removed from a fishing line. Fourth, make the bobber self-uprighting. Other objects of this invention will be seen in the detailed description, which will make additional objects obvious to those skilled in the art.

In summary, one embodiment of this invention has a stem with a cross section just less than the cross section of a float bore, the stem having a stem upper end, a stem body, a stem bulge in the stem body, and a stem in-water end. The stem also having above the stem in-water end a stem channel extending radially to the center of the cross section and extending vertically from the in-water end, so that the line will automatically hang along the center line of the bobber with no moment arm for vertical forces to cause rotation of the bobber. The stem further having a stem slot through the stem along a diameter of the cross section, the stem slot also extending vertically from the stem channel and ending with a stem slot entry section which breaches the stem body at a stem slot mouth into which a fishing line can be placed, allowing the stem bulge to be removably wedged into the float bore with the stem slot mouth inside the float bore and with the stem slot bottom below the float keel end, thus holding the fishing line so that it will slip and so that the fishing line hook end will fall vertically through the stem channel automatically positioning and keeping the bobber upright.

Other embodiments will be seen in the detailed description, which will make additional embodiments obvious to those skilled in the relevant art.

DRAWING FIGURES

FIG. 1 shows how the float, the stem, and the fishing line are disposed with the stem removably wedged into the float bore.

FIG. 2 is a cross-section view taken on the line 2—2 in FIG. 1 showing the fishing line passing through the slot into the channel.

FIG. 3 shows the bobber upright in water.

FIG. 4 shows the bobber remaining upright in water even though the inertia of the hook end has pulled the bobber downward.

FIG. 5 shows the rotation of the bobber caused by a fish taking the bait.

FIG. 6 shows an alternate stem.

FIG. 7 shows the alternate stem about to thread the fishing line through the float bore by means of a notch.

FIG. 8 shows the fishing line threaded through the float bore by the alternate stem.

FIG. 9 shows the fishing line in the stem slot of the alternate stem prior to removably wedging the alternate stem into the float bore.

DETAILED DESCRIPTION OF THE INVENTION

FIG. 1 shows the angler's two piece, self-uprighting slip bobber, generally denoted as 10. The stem 11 has been inserted into the float bore 34 in the float 31. FIG. 3 shows the bobber 10 in water. The stem upper end 12 and the float visible end 32 are out of the water. The stem in-water end 15, the float keel end 33, and the fishing line hook end 42 are submerged while the fishing line 41 proceeds out of water to the fishing line angler end 43 and to an angler (not shown).

The shape of the float 31 shown is a common shape which has the visible end on a generally hemispherical portion and has a generally conical portion ending with the keel end, but the shape is not important to the function of the bobber, except that the float must have sufficient buoyancy to support the bobber, that there must be no moment arm for vertical forces to cause unwanted rotation, and that the shape also be rotationally stable relative to other forces normally encountered while angling. The best shape would be the shape which would be the most rotationally stable, and, though the shape shown is the best known to the inventor, the inventor has not studied shapes exhaustively, and it is not alleged that the shape shown is altogether the best shape.

The stem body 13 has a cross section just smaller than the cross section of the float bore. The shapes of the cross sections shown are generally circular, but the shape of the cross sections is not important, except to minimize manufacturing costs. In use as shown, the stem center line 17 and the float and bore center line 35 coincide. The stem also has a stem channel 16 extending radially into the stem body 13 to just beyond the stem center line 17 and extending upward from the stem in-water end 15 to the stem slot bottom 25. The stem slot 21 extends fully through the stem body 13. The slot is shown in FIG. 2 along the same radius as the stem channel 16 and along the extension of that radius to the full diameter. The stem slot 21 has a stem slot vertical section 24 extending upward along the stem center line 17. The stem slot then angles toward the periphery of the stem body by a stem slot entry section 23 which breaches the stem at a stem slot mouth 22.

A fishing line 41 can be removably placed into the stem slot mouth, through the stem slot entry section, down the stem slot vertical section, to the stem slot bottom, so that the fishing line hook end will pass down the stem channel.

The stem also has a stem bulge 14, which is located at the stem slot mouth in the preferred embodiment. The cross section of the stem bulge is just greater than the float bore cross section so that the stem can be removably wedged into the float bore with the stem slot mouth inside the float bore and with the stem slot bottom below the float keel end.

Thus the fishing line will be attached to the bobber and the fishing line will be free to slip through the stem slot. The amount of fishing line which can slip through the stem slot can be limited by a fishing line stop 44 on the fishing line angler end side of the stem slot. The fishing line stop 44 is visible in FIG. 2 where it can be seen that the fishing line stop is larger than the slot and can not pass through the slot. The fishing line stop can be a piece of string knotted tightly around the fishing line so that the knot can be forced to slide along the fishing line by an angler but will not be moved by the forces which normally occur while angling.

The stem bulge 14 can be a shoulder, or can be the result of a taper, or can be any other form by which the stem body can be removably attached to the float. The float bore can also be tapered, or otherwise formed, to facilitate the fit. The stem bulge can be removably wedged into the float bore because the float is sufficiently resilient. In the preferred embodiment the stem itself is resilient in the stem body between the stem slot mouth and the stem slot bottom, so that the stem can be removably wedged into the float bore without depending on any resiliency of the float.

Because the stem center line 17 and the float and float bore center line 35 coincide, the fishing line passing along the stem channel 16 is coincident with the vertical extension of the stem center line and the float and float bore center line. Thus, there is no moment arm for vertical forces to cause an unwanted rotation of the bobber away from vertical. This means that when the bobber rides down a ripple in a body of water and the inertia of the fishing line hook end pulls the bobber further downward—as shown in FIG. 4—the bobber will not be rotated to give a false indication of a fish taking the bait. Rotation would correctly occur when a fish does take the fishing line hook end away from vertical as shown in FIG. 5.

FIG. 6 shows an alternate version of the stem 11'. Here the alternate stem bulge 14' in the alternate stem body 13' is near the alternate stem upper end 12'. The alternate stem can be removably wedged into the float bore from the float visible end so that the alternate stem slot mouth 22' is inside the float bore and the alternate stem slot bottom 25' is below the float keel end. The alternate stem bulge 14' can be a shoulder, or can be any other form by which the stem body can be removably attached to the float. The float bore can also be tapered, or otherwise formed, to facilitate the fit. The alternate stem bulge shown can be removably wedged into the float bore because the float is sufficiently resilient.

To get the fishing line into the alternate stem slot 21' a loop of the fishing line must be threaded through the float bore from the float keel end to beyond the float visible end as shown in FIG. 8. To do this an alternate stem notch 26' is provided just above the alternate stem in-water end 15'. FIG. 7 shows how the alternate stem is inserted through the float bore until the alternate stem notch mouth 27' can engage the fishing line, whereupon the stem is retracted and the fishing line is placed through the alternate stem slot mouth 22' down the alternate stem slot entry section 23' down the alternate stem slot vertical section 24' to the alternate stem slot bottom 25'. As in the preferred stem the alternate stem channel 16' is along the alternate stem center line 17' so that the bobber will still be self-uprighting.

This slip bobber can also be used as fixed bobber by rotating the stem about the stem center line, with the fishing line in the stem slot, to wind a turn or more of fishing line around the stem before removably wedging the stem into the float bore so that the fishing line is also removably wedged into the float bore, with the fishing line hook end still fitting into the stem channel.

Other means for removably attaching a stem to a float so that there is no moment arm to allow unwanted rotation of the bobber, and other means to easily attach a fishing line to a slip bobber with few parts which are easy to manufacture, assemble, and market will be obvious to people skilled in the art. It is understood therefore that this invention is not limited to the particular embodiments disclosed here.

I claim:

1. A self-uprighting bobber comprising:

a float, the float having a float keel end, having a float visible end, and having a float bore through the float from the float visible end to the float keel end, the float bore having a float bore cross section which is centered in the float to render a combined float and float bore center line along which all net vertical forces act when the bobber is used for angling;

a stem, the stem having a stem in-water end, a stem upper end, and a stem body, the stem body having a stem cross section just less than the float bore cross section and having a stem center line, so that the stem can be removably disposed into the float bore with the stem in-water end below the float keel end and with the stem center line coinciding with the float center line so that when the bobber is used for angling all net vertical forces act along the coincident stem centerline and float and float bore center line;

a stem slot fully through the stem body, the stem slot having a stem slot bottom in the stem body above the stem in-water end, the stem slot having a stem slot vertical section extending from the stem slot bottom in the stem body along the stem center line toward the stem upper end, the stem slot further having a stem slot entry section which connects the stem slot vertical section with a stem slot mouth which breaches the stem body, so that a fishing line can be placed through the stem slot mouth, through the stem slot entry section, down the stem slot vertical section to the stem slot bottom;

a stem channel, the stem channel extending radially into the stem body to just beyond the stem center line, the stem channel also extending from the stem slot bottom to the stem in-water end, so that a fishing line hook end will hang in the stem channel along the stem center line and thus also hang along the float and float bore center line so that when the bobber is used for angling all net vertical forces act along the coincident stem center line and float and float bore center line; and a stem bulge in the stem body, the stem bulge making the stem cross section just greater than the float bore cross section, so that the stem bulge can be removably wedged into the float bore with the stem slot mouth inside the float bore and with the stem slot bottom below the float keel end so that the fishing line is held loosely in the stem slot and can freely slip through the stem slot.

2. The self-uprighting bobber of claim 1 wherein the stem bulge is located at the stem slot mouth, so that the stem body can be removably wedged into the float bore from the float keel end with the stem slot mouth inside the float bore and with the stem slot bottom below the float keel end.

3. The self uprighting bobber of claim 1 wherein the stem bulge is located near the stem upper end, so that the stem body can be removably wedged into the float bore from the float visible end with the stem slot mouth inside the float bore and with the stem slot bottom below the float keel end.

4. The self uprighting bobber of claim 3 further comprising a stem notch in the stem body just above the stem in-water end, so that the stem can be removably disposed through the float bore with the stem notch just below the float keel end whereupon the fishing line can be engaged by the stem notch and the stem can be pulled out of the float visible end threading a loop of the fishing line through the float bore, from where the fishing line can be fitted into the stem slot.

* * * * *